United States Patent [19]

Miller

[11] 4,358,968
[45] Nov. 16, 1982

[54] POWER TRANSFER DEVICE IDLER GEAR

[76] Inventor: Bernard J. Miller, R.D. #1, Box 133, West Alexander, Pa. 15376

[21] Appl. No.: 117,645

[22] Filed: Jan. 29, 1980

[51] Int. Cl.³ .............................................. F16H 1/40
[52] U.S. Cl. ....................................... 74/713; 74/777; 74/710
[58] Field of Search ................. 74/713, 710, 799, 660, 74/10, 781 R, 784, 777, 780, 417

[56] References Cited

U.S. PATENT DOCUMENTS

| 189,914 | 4/1877 | Blakeslee | 74/799 X |
|---|---|---|---|
| 477,095 | 6/1892 | Adams | 74/799 |
| 741,931 | 10/1903 | Sandell | 74/713 |
| 789,910 | 5/1905 | Hill | 74/710 |
| 805,740 | 11/1905 | Lowe | 74/713 |
| 2,090,810 | 8/1937 | Russell | 74/660 X |
| 2,200,153 | 5/1940 | Bush | 74/713 |
| 2,292,578 | 8/1942 | McIntyre | 74/713 X |
| 2,376,900 | 5/1945 | Case | 74/799 |
| 3,247,239 | 4/1966 | Wuesthoff | 74/713 X |
| 3,896,684 | 7/1975 | Duer | 74/713 X |
| 4,006,607 | 2/1977 | Kane | 74/710 X |
| 4,077,278 | 3/1978 | Combastet | 74/710 X |
| 4,125,026 | 11/1978 | Koshino | 74/713 |
| 4,224,839 | 9/1980 | von Kaler | 74/713 X |

Primary Examiner—Nile C. Byers, Jr.
Attorney, Agent, or Firm—Harvey B. Jacobson

[57] ABSTRACT

A power transfer device including a gear box which is rotatably driven from a suitable power source and provided with an output shaft for transmitting power to a desired location at a predetermined speed in relation to the input rotational speed of the gear box and a stationary shaft projecting from the gear box in which the stationary shaft and output shaft have bevel gears on the inner ends thereof in meshing engagement with bevel gears journaled on independent parallel shafts extending transversely of the gear box with each of the bevel gears on the parallel shafts including a spur gear connected therewith and in meshing engagement with an idler gear or idler gears on an idler shaft with the spur gears having a predetermined ratio for determining the output shaft speed. The specific arrangement of components is such that rotational movement of the gear box is necessary to produce output shaft movement whereas the output shaft cannot be rotated when the gear box is not being driven.

8 Claims, 8 Drawing Figures

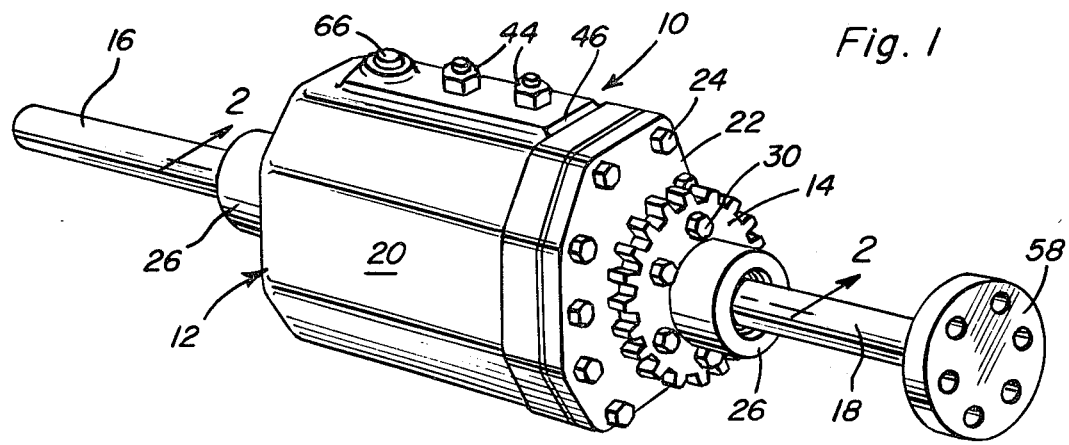
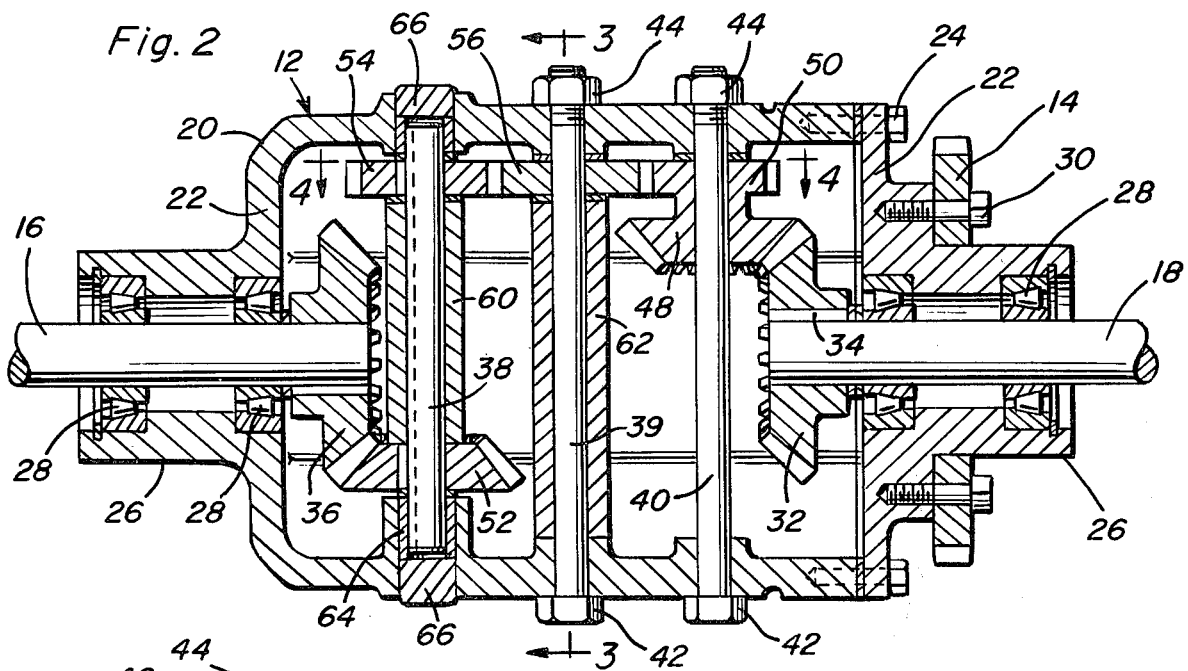
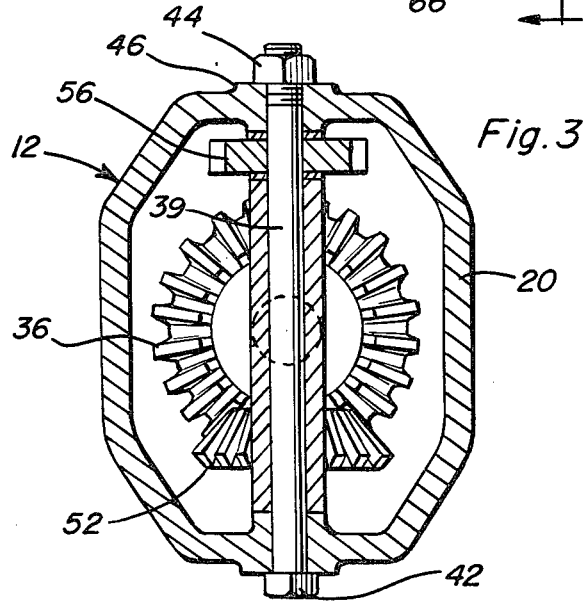
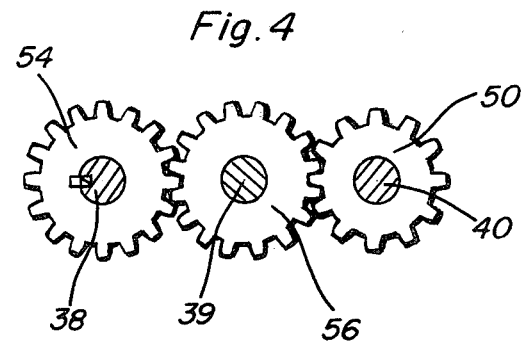
Fig. 1
Fig. 2
Fig. 3
Fig. 4

POWER TRANSFER DEVICE IDLER GEAR

BACKGROUND OF THE INVENTION

1. Field of the Invention

The present invention generally relates to a device for transmitting power from a power source to an output shaft in a manner that the output shaft cannot be rotated unless the gear box forming part of the power transfer device is driven in a rotatable manner.

2. Description of Relevant Art

Many power transfer devices have been provided for transmitting power from a prime mover or other power source to a point of use of rotational power with such developments including various types of transmissions, gear systems, and the like.

SUMMARY OF THE INVENTION

An object of the present invention is to provide a power transfer device to transfer rotational torque from an input source such as a prime mover or the like to an output shaft connected with any suitable point of use in which rotational torque is necessary to drive a machine, device, or the like, and a gear box is provided with a gear assembly disposed therein and oriented and constructed in a manner that it is necessary for the gear box to be rotatably driven in order to produce rotation of an output shaft with the output shaft not being capable of being rotated when the gear box is not being rotatably driven.

Another object of the present invention is to provide a power transfer device in accordance with the preceding object in which a stationary shaft also extends from the gear box and is stationarily mounted to a fixed frame or other structure by any suitable means with the stationary shaft and output shaft being disposed in opposed relation and provided with bevel gears on the inner ends thereof which are spaced from each other.

A further object of the present invention is to provide a power transfer device in accordance with the preceding objects in which the gear box is provided with three parallel supporting shafts extending perpendicularly to the bevel gears on the inner ends of the stationary shaft and output shaft with the outer pair of shafts each including a bevel gear thereon in meshing engagement respectively with the bevel gears on the output shaft and stationary shaft and spur gears connected with the bevel gears on the pair of shafts with the spur gears being in meshing engagement with a spur gear on the third shaft with the spur gears having different sizes and number of teeth thereon to produce a desired output ratio between the rotational input of the gear box and the rotational output of the output shaft.

Yet another object of the present invention is to provide a power transfer device in accordance with the preceding objects having a balanced structural arrangement which is quite simple and dependable in operation and capable of use in many orientations where it is desired to transmit rotational power to a machine, or the like, requiring a particular rotational torque and speed with the output shaft of the power transfer device remaining stationary until a power source is drivingly connected to the gear box thereby assuring that the output shaft cannot be driven by the machine or other device to which it is connected.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the power transfer device of the present invention.

FIG. 2 is a longitudinal sectional view of the power transfer device of the present invention taken substantially upon a plane passing along section line 2—2 of FIG. 1 illustrating the structure and orientation of the components of the device.

FIG. 3 is a transverse, sectional view taken substantially upon a plane passing along section line 3—3 of FIG. 2 illustrating further structural details of the gear arrangement within the gear box.

FIG. 4 is a plan sectional view taken along section line 4—4 of FIG. 2 illustrating the relationship of the spur gears in the structure illustrated in FIGS. 1-3.

DESCRIPTION OF THE PREFERRED EMBODIMENT

Figure 5:
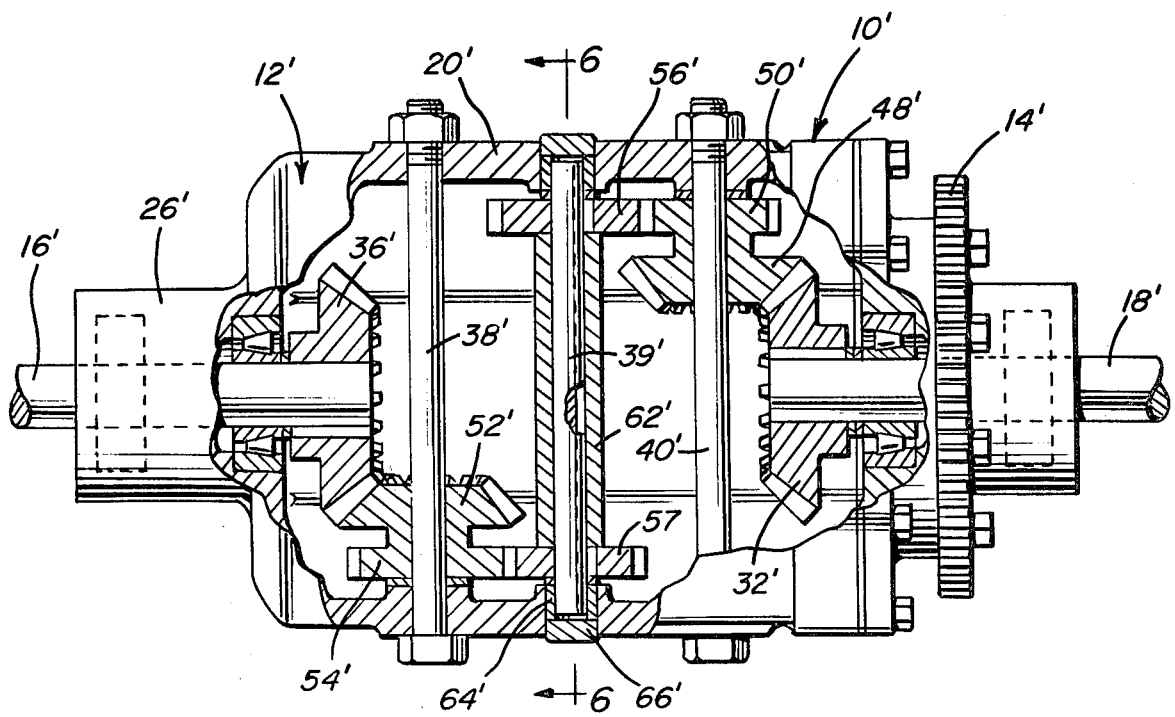
FIG. 5 is a sectional view similar to FIG. 2 but illustrating a modified form of the invention in which the intermediate shaft is provided with two bevel gears so that the integral bevel gear and spur gear assembly on the outer pair of shafts are at opposite ends thereof.

Referring now specifically to FIGS. 1-4 of the drawings, the power transfer device of the present invention is generally designated by the numeral 10 and includes a gear box or casing generally designated by the numeral 12 which includes an input gear 14 connected therewith and includes an output shaft 16 projecting from one end thereof and a stationary shaft 18 projecting from the other end thereof with the shafts 16 and 18 being in alignment with each other and extending internally of the gear box 12.

The gear box 12 includes a peripheral wall 20 of any suitable shape and configuration and end walls 22 one of which may be removable by the use of suitable cap screws, bolts, or the like, 24 to provide access to the interior of the gear box 12. Also, each end wall 22 is provided with a cylindrical boss 26 at the center thereof with the bosses 26 receiving the shafts 16 and 18 and rotatably journaling the shafts 16 and 18 in relation to the gear box 12 by the use of spaced tapered roller bearings 28 which serve as longitudinal thrust bearings as well as radial bearings, so that the gear box 12 and the shafts 16 and 18 may rotate in relation to each other. Also, one of the end walls or any other portion of the gear box or casing is provided with the input gear 14 rigidly affixed thereto such as by cap screws or bolts 30 to enable any desired type and size of gear 14 to be connected to the gear box 12. The input gear 14 may be in the form of a spur gear, sprocket gear or any other suitable type of drive, including a V-belt pulley, or the like, in order to connect a driving source, such as a prime mover or the like to the gear box 12 to rotate the gear box 12 at a desired rotational speed.

The inner end of the stationary shaft 18 is provided with a bevel gear 32 affixed thereto in any suitable manner such as by a keyed connection as at 34. Also, the output shaft 16 is provided with an identical bevel gear 36 attached to the output shaft 16 in the same manner. The gears 32 and 36 are in alignment with each other and axially spaced from each other within the gear box 12 as illustrated in FIG. 2. Extending in parallel relation to each other and in perpendicular relation to the bevel gears 32 and 36 and in alignment with the center of the shafts 16 and 18 are three gear shafts 38, 39 and 40 which extend transversely of the peripheral wall 20 and shafts 39 and 40 may be in the form of elongated bolts having a head 42 at one end thereof and a retaining nut 44 at the other end thereof to enable assembly and disassembly of the shafts 39 and 40 in relation to the gear box 12. The opposite portions of the peripheral wall 20 where the shafts 39 and 40 extend therethrough may be enlarged to form longitudinal bosses 46 to more effectively support the shafts 39 and 40 which are stationary in relation to the gear box 12.

Mounted on one end of the shaft 40 is a combination bevel gear 48 and spur gear 50 which are integral with each other and rotatably journaled on the shaft 40 with the bevel gear 48 being in meshing engagement with the stationary bevel gear 32 and integral with or otherwise rigid with the spur gear 50 which is disposed radially outwardly of the bevel gear 48.

The shaft 38 is rotatable and provided with a bevel gear 52 and spur gear 54 at opposite ends thereof with the bevel gear 52 in meshing engagement with the rotatable bevel gear 36 connected to the rotatable output shaft 16 and the spur gear 54 being in meshing engagement and driving engagement with a spur gear 56 journaled on shaft 39.

As illustrated, the bevel gear 48 and spur gears 50 and 56 are rotatable on their respective shafts 39 and 40 while bevel gear 52 and spur gear 54 are keyed to shaft 38 and the bevel gear 48 on the shaft 40 is in meshing engagement with the bevel gear 32 and the bevel gear 52 on the shaft 38 is in meshing engagement with the bevel gear 36 so that the geared connection between the rotatably driven gear box 12, the stationary shaft 18 and the output shaft 16 is through the stationary bevel gear 32, the bevel gear 48, the spur gear 50, the spur gears 56 and 54, the bevel gear 52 and the bevel gear 36. The spur gears 50 and 56 are of different size and have different numbers of teeth thereon to provide a predetermined drive ratio between the input gear 14 and the output shaft 16 with the arrangement being such that with the stationary shaft 18 locked in position in any suitable manner, such as being bolted to a frame, or the like, by the use of a flanged coupling 58, or the like, the output shaft 16 can be rotated only when the input gear 14 is being rotated. When the input gear 14 is not being rotated and the gear box 12 is stationary, the output shaft 16 cannot be rotated.

The difference in size and number of teeth on the meshed spur gears 50, 56 and 54 is illustrated in FIG. 4 with it being pointed out that the arrangement and ratio may be varied depending upon the desired ratio between the input rotational speed and the output rotational speed. Also, as illustrated, spacers in the form of sleeves 60 and 62 are provided on the shafts 38 and 39 respectively to retain the gears thereon in properly oriented position. Also, the rotatable shaft 38 is provided with suitable bearings such as bushings 64 to journal the ends of the shaft 38 in the housing 20 with suitable conventional means being provided to retain the shaft 38 longitudinally within the housing 20, such as a removable plug-type cap 66 which may be either press fitted into or screw threaded into the end portion of the bore which receives the shaft 38 to enable removal thereof.

Figure 6:
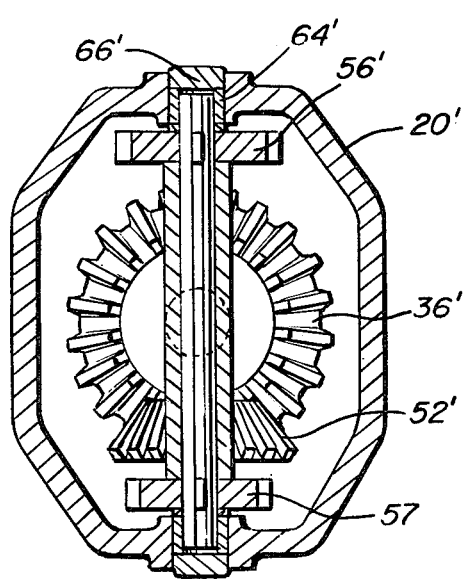
FIG. 6 is a transverse, sectional view taken substantially upon a plane passing along section line 6—6 on FIG. 5.
Figure 7:
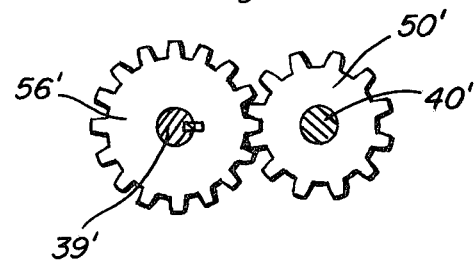
FIG. 7 is a schematic plan view illustrating the relationship of one pair of spur gears.
Figure 8:
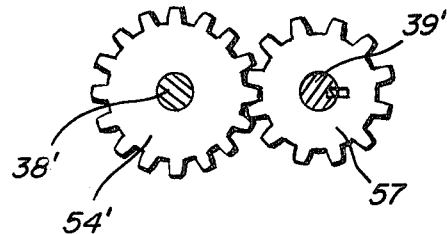
FIG. 8 is a schematic plan view illustrating the relationship of another set of spur gears.

FIGS. 5–8 illustrate another embodiment of the invention in which substantially the same basic arrangement of components is employed, but in this arrangement, the intermediate shaft 39' is rotatable in the housing 20' and provided with spur gears 56' and 57 at the opposite ends thereof which are keyed to the rotatable shaft 39' with the gear 56' being in meshing engagement with the spur gear 50' and the additional spur gear 57 being in meshing engagement with the spur gear 54' on the stationary shaft 38' in which the spur gear 54' is integral and thus rigid with the bevel gear 52'. In this arrangement, the sleeve 62' maintains the spur gears 56' and 57 spaced apart properly and the rotatable shaft 39' is journaled in the housing 20' by the same types of bushings 64' and removable closure cap 66' as employed in conjunction with the rotatable shaft 38 in FIG. 2. In this arrangement, the forces are more dynamically balanced since the driving force is from the stationary bevel gear 32' to the bevel gear 48', spur gear 50', spur gear 56', shaft 39', spur gear 57, spur gear 54', bevel gear 52' and bevel gear 36' to the output shaft 16'. This arrangement provides more effective dynamic balance and if desired, oppositely arranged spur gears may be provided on the shafts 40' and 38' to balance the gearing system. Variations in the ratio may be provided by varying the size and number of teeth in the meshing spur gears with FIGS. 7 and 8 illustrting one embodiment of this arrangement in which the spur gears 50', 56', 57 and 54' vary in diameter and number of teeth.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A power transfer device comprising a gear box, means on the gear box for driving connection with a power source to rotate the gear box about an axis of rotation, a stationary shaft extending into and rotatably supporting the gear box and defining its axis of rotation, an output shaft extending into and journaled from the gear box for rotation about the same axis as the gear box, and gear means including spur gears and bevel gears interposed between the stationary shaft, gear box and output shaft to drive the output shaft at a predetermined ratio with respect to the gear box, said stationary and output shafts being in axial alignment with the inner ends spaced apart within the gear box, said gear means including a stationary bevel gear on the inner end of the stationary shaft and a driven bevel gear on the inner end of the output shaft, three shafts extending transversely of the gear box in perpendicular relation to the axis of rotation thereof, a bevel gear and spur gear on each of the outermost of said parallel shafts, the bevel gear on one of the parallel shafts being meshed with the bevel gear on the stationary shaft, the bevel gear on the other of the parallel shafts being meshed with the bevel gear on the output shaft, said bevel gears on the parallel shafts being laterally spaced from each other and connected with the spur gear on the same shaft, and a spur gear on the intermediate of said parallel shafts forming part of said gear means.

2. The device as defined in claim 1 wherein certain of said spur gears are of different diameter and have different number of teeth thereon.

3. The device as defined in claim 2 wherein said bevel gears and spur gear on at least one of the parallel shafts are of one-piece construction.

4. The device as defined in claim 1 wherein said intermediate shaft has a second spur gear thereon with the spur gears being fixed to said intermediate shaft at opposite ends thereof and in meshing engagement with the spur gears on the outermost pair of shafts, and means rotatably journaling said intermediate shaft from said gear box.

5. The device as defined in claim 4 wherein the bevel gear and spur gear on each of outermost pair of shafts are integral and rotatably journaled on their respective shafts.

6. The device as defined in claim 1 wherein the bevel gear and spur gear on the shaft having the bevel gear thereon meshed with the bevel gear on the output shaft being located at opposite ends of the shaft and rigidly connected to the shaft, and means rotatably journaling the shaft with the bevel gear thereon meshed with the bevel gear on the output shaft from the gear box.

7. The device as defined in claim 6 wherein certain of the spur gears are of different diameter and have a different number of teeth thereon to change the ratio between input and output.

8. The device as defined in claim 1 wherein said gear box includes a pair of axially aligned bosses at the opposite ends thereof rotatably journaling the output shaft and rotatably receiving the stationary shaft, respectively, the end of the gear box receiving the stationary shaft being removably connected to the remainder of the gear box to enable access to the interior of the gear box, said means on the gear box for driving connection with the power source including a gear removably mounted on the removable end of the gear box.

* * * * *